United States Patent Office 3,427,265
Patented Feb. 11, 1969

3,427,265
COMPOSITION OF MATTER CONTAINING WAX AND A RESINOUS COPOLYMER OF ETHYLENE
Keith C. Brinker, Fairfax, Wilmington, Del., assignor to E. I. du Pont de Nemours and Company, Wilmington, Del., a corporation of Delaware
No Drawing. Filed Nov. 9, 1965, Ser. No. 507,062
U.S. Cl. 260—17.4    7 Claims
Int. Cl. C08f 45/52; C09d 5/20

ABSTRACT OF THE DISCLOSURE

A resinous, thermoplastic protective coating composition which is readily strippable from the substrate to which it is applied is disclosed. The composition basically comprises an ethylene copolymer-wax blend containing a small amount of a particular water-soluble surface active agent. The surface active agents include, among others, sucrose or raffinose esters of certain fatty acids, nonylphenoxy polyoxyethylene ethanol, dihexyl sodium sulfosuccinate, polyoxyethylene sorbitan monostearate, and polyoxyethylene cocoa amine.

---

This invention relates to a composition of matter. More particularly, it is concerned with a readily strippable protective plastic coating.

It is an object of the present invention to provide a resinous, thermoplastic protective coating that is easily strippable from the substrate to which it is applied.

In accordance with the present invention a thermoplastic composition of matter is provided comprising (1) from about 5% to about 50% by weight of a copolymeric resin of ethylene and a member of the class consisting of methyl methacrylate, ethyl acrylate, methyl acrylate and vinyl acetate, (2) from about 95% to about 50% by weight of petroleum wax having a melting point between about 130° F. and about 170° F., and (3) from about 0.005% to about 5% of a water soluble surface active additive from the class consisting of (a) an ester of a fatty acid containing from about 6 to about 30 carbon atoms and a saccharide from the class consisting of sucrose and raffinose, (b) and alkylphenoxy polyoxyethylene ethanol, (c) an alkali metal salt of dialkyl sulfosuccinate, (d) the polyoxyethylene derivative of a higher fatty acid ester of sorbitan, and (e) the polyoxyethylene derivative of cocoa amine. This composition, which may be applied to glass, metal, resinous or cellulosic substrates by dipping into or spraying the melt, provides on hardening, by cooling, a strong, tough, protective coating which may be later removed without difficulty. Such coatings are very useful in protecting parts during manufacture or protecting manufactured articles from damage due to blows, moisture or corrosion during shipment. Preferably the ethylene copolymer has a copolymeric content of from about 20% to about 35% and a melt index [1] between about 5 and 500. Such copolymers are well known in the art. Generally, they are prepared by oxygen or peroxide catalyzed polymerization of a suitable blend of the monomers at moderately elevated temperature and under high pressure. The composition of the present invention is prepared by simply melt blending the ingredients together in appropriate proportion with agitation. Addition of the water soluble surface active additive results in a substantial improvement in strippability of the hardened film from the substrate to which it is applied, as is demonstrated in the following illustrative examples.

[1] As defined by ASTM D1238.

The examples are not intended to limit the invention in any manner.

EXAMPLES

A series of compositions is prepared by melting together (A) 30% by weight of a copolymer of ethylene and vinyl acetate having a melt index of 15 and wherein the polymerized vinyl acetate constitutes about 30% by weight of the copolymer, (B) 70% by weight of petroleum wax having a melting point of about 154° F. and (C) 0.5% by weight based on the total of (A) and (B) of the sucrose ester identified in Table I.

TABLE I

| Ex. | Sucrose Ester | Acyl Carbon No. | Percent Elongation [1] | Tensile Strength (p.s.i.) [1] |
|---|---|---|---|---|
| 1 | Distearate | 18 | 29 | 830 |
| 2 | Dilaurate | 12 | 35 | 800 |
| 3 | Dioleate | 18 | 37 | 800 |
| 4 | Monolaurate | 12 | 33 | 760 |
| 5 | Mono-hydrogenated tall oil acid | 12–14 | 34 | 760 |

[1] Measured upon a 15 mil cast film at 2″/min.

A cast film of a comparable control composition containing no sucrose ester additive is observed to have a percent elongation of 39 and a tensile strength of 800 p.s.i. When applied as a melt to glassine paper (15 pounds/3000 square feet of paper) and permitted to harden at room temperature, the peel strength of the control sample (i.e., the force required to peel the polymeric coating from the glassine substrate) is 110 grams/inch. The peel strength of each of the compositions of Examples 1–5 inclusive is less than 3 grams per inch.

A second series of compositions is prepared using the same ethylene copolymer, petroleum wax combination described above, but including the various surface active additives of Table II. In each example 0.1% by weight (based on copolymer and wax) of surface active agent is used except in Examples 6 and 8 where 0.01% and 1.0% is used, respectively. Each of these compositions is applied to glassine in the manner previously described but was thereafter heat sealed for 1 second at 250° F. under 30 p.s.i. Peel strength for each sample is shown in the table.

TABLE II

| Ex. | Additive | Peel Strenght [1] |
|---|---|---|
| 6 | (Same as 5) | 9 |
| 7 | ...do | 7 |
| 8 | ...do | 5 |
| 9 | Nonylphenoxy polyoxyethylene ethanol | 7 |
| 10 | Dihexyl sodium sulfosuccinate | 11 |
| 11 | Polyoxyethylene sorbitan monostearate | 8 |
| 12 | Polyoxyethylene cocoa amine | 7 |

[1] Grams/inch.

A control sample, similarly heat sealed, but containing no additive, has a peel strength of 144 grams per inch.

Examples 1–5 inclusive illustrate a variety of saccharide fatty acid esters useful as peel inducing additives whereas Examples 6–12 are representative examples of the various classes of materials that can be employed. The mono-sucrose esters are preferred due to their high gloss stabilities. In general, it is preferred that from about 0.05 to about 0.5% of the additive (based on resin-wax) be used. In the resin-wax composition, it is preferred that the resin constitute from about 20% to about 40% by weight with the wax making up the remainder.

The compositions of the present invention have been found particularly useful in the coating of metal plates, scissors and knives.

Many equivalent modifications of the invention will become apparent to those skilled in the art from a reading of the above without a departure from the inventive concept.

What is claimed is:

1. A readily strippable, thermoplastic composition of matter consisting essentially of (1) from about 5% to about 50% by weight of a copolymeric resin of ethylene and a member of the class consisting of methyl methacrylate, ethyl acrylate, methyl acrylate and vinyl acetate, (2) from about 95% to about 50% by weight of petroleum wax having a melting point between about 130° F. and about 170° F., and (3) from about 0.005% to about 5% of a water soluble surface active additive from the class consisting of (a) an ester of a fatty acid containing from about 6 to about 30 carbon atoms and a saccharide from the class consisting of sucrose and raffinose, (b) an alkylphenoxy polyoxyethylene ethanol, (c) an alkali metal salt of dialkyl sulfosuccinate, (d) the polyoxyethylene derivative of a higher fatty acid ester of sorbitan, and (e) the polyoxyethylene derivative of cocoa amine.

2. The composition of claim 1 wherein the said surface active agent is present in the said composition in an amount of from about 0.05% to about 0.5% based on the weight of ethylene copolymer and wax.

3. The composition of claim 2 wherein the said surface active agent is an ester of a fatty acid containing from about 12 to about 18 carbon atoms, and sucrose.

4. The composition of claim 2 wherein the said surface active agent is nonylphenoxy polyoxyethylene ethanol.

5. The composition of claim 2 wherein the said surface active agent is dihexyl sodium sulfosuccinate.

6. The composition of claim 2 wherein the said surface active agent is polyoxyethylene sorbitan monostearate.

7. The composition of claim 2 wherein the said surface active agent is polyoxyethylene cocoa amine.

References Cited

UNITED STATES PATENTS

| 2,808,381 | 10/1957 | Stone | 260—17.4 |
| 2,910,384 | 10/1959 | Toulmin | 117—132 |
| 3,175,986 | 3/1965 | Apikos et al. | 260—28.0 |

WILLIAM H. SHORT, *Primary Examiner.*

E. A. NIELSEN, *Assistant Examiner.*

U.S. Cl. X.R.

260—28.5; 117—6; 260—23